Feb. 2, 1932.                A. V. BURCH                1,843,863
                DISK CULTIVATOR ATTACHMENT FOR CULTIVATORS
                         Filed Jan. 13, 1930
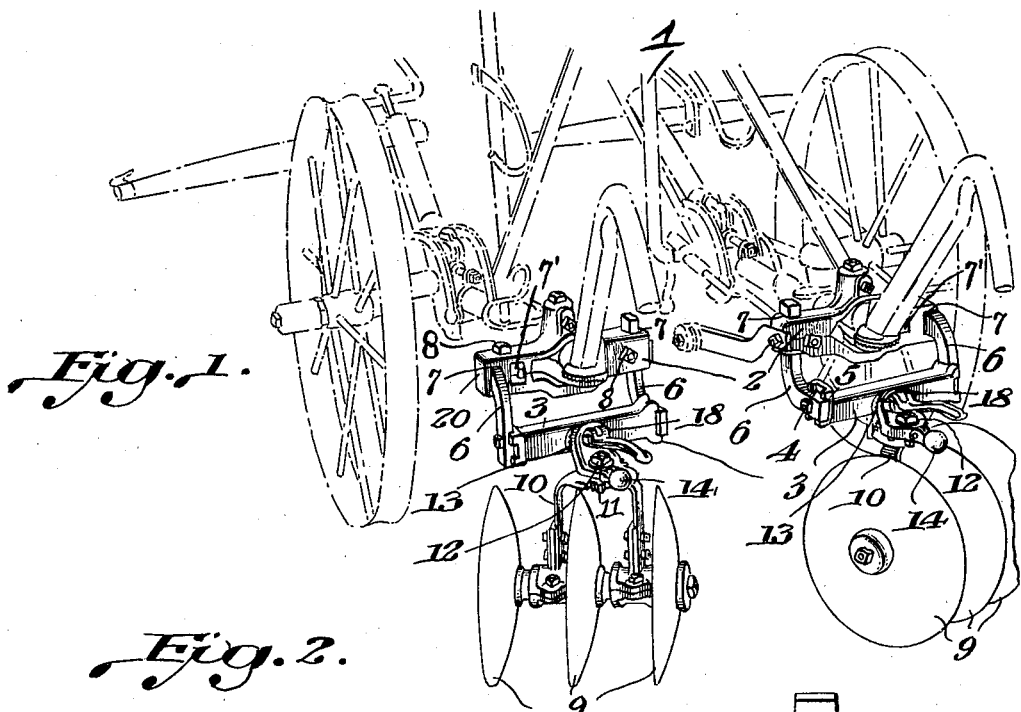
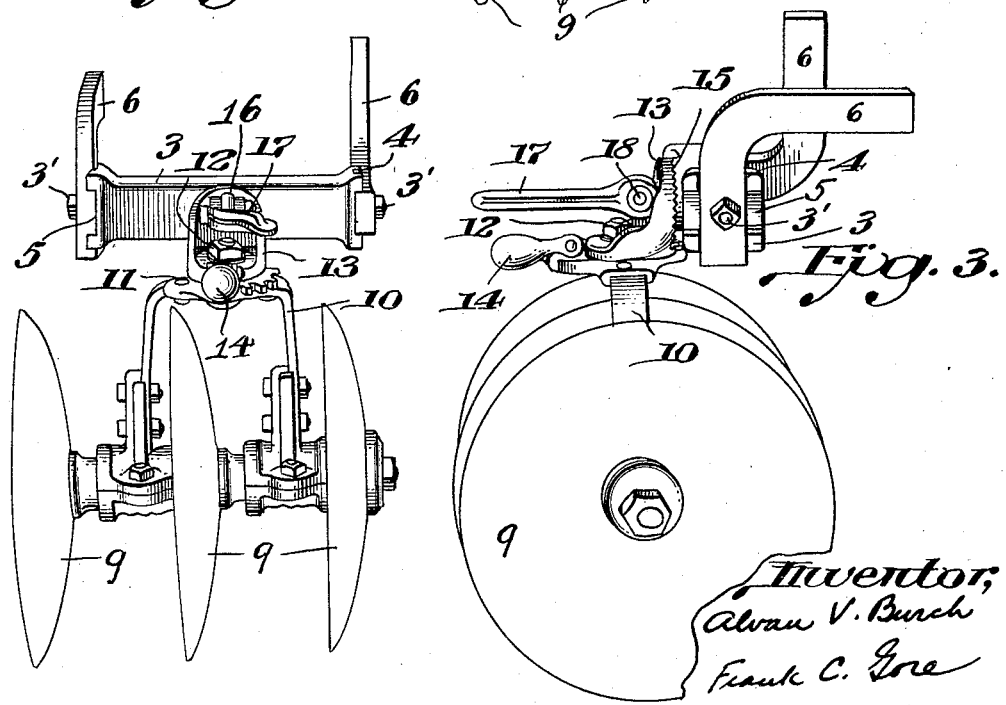
Inventor,
Alvan V. Burch
By Frank C. Gore
                        Atty.

Patented Feb. 2, 1932

1,843,863

UNITED STATES PATENT OFFICE

ALVAN V. BURCH, OF EVANSVILLE, INDIANA

DISK CULTIVATOR ATTACHMENT FOR CULTIVATORS

Application filed January 13, 1930. Serial No. 420,444.

This invention relates to an improved disk cultivator attachment whereby a gang of cultivator disks can be attached to any cultivator as a substitute for the usual shovels regardless of the type of shovel-carrying cross head employed, and interchangeably used with shovels if the cultivator has a cross head or similar means for the attachment of shovels.

The invention provides improved unitary attaching means whereby a gang or group of disks can be bodily applied to any type of cross head used on the cultivator and which embodies novel combinations of parts enabling the gang of disks to be disposed at any desired angle horizontally and vertically or completely reversed, thereby permitting a shovel cultivator to be readily converted into a disk cultivator with adaptability for any desired adjustment of the disks and, when desired, converted back into a shovel cultivator merely by removing the self-contained or unitary gang of disks and its adjusting means.

By the provision of novel attaching members of angular shape and a head adapted for the attachment of said members thereto in different positions, my unitary disk attachment is made "universal", that is, it is rendered adaptable for attachment to any cultivator having a shovel cross head provided with either horizontal or vertical shank-holders, thus enabling the user to convert his cultivator from a shovel cultivator into a disk cultivator, without requiring special fitting of the parts.

A practical embodiment of the invention which has been successfully used, is hereinafter described and is shown in the accompanying drawings, in which:

Figure 1 is a rear perspective showing my improvements applied to a cultivator;

Fig. 2 is a detail rear view of the attachment; and

Fig. 3 is a side view thereof.

The complete self-contained, unitary disk attachment is shown by itself in Figs. 2 and 3 and is illustrated as attached to the shovel cross head of a cultivator in Fig. 1.

One type of wheeled cultivator is shown in Fig. 1, at 1, being provided with the usual draft appliances and having the cross heads 2 for the shovels which are commonly employed in connection therewith.

The cross heads 2 vary on different wheeled cultivators and one of the objects of my invention is to provide a unitary disk attachment which can be connected to any type of cross head, commonly used at 2.

With that object in view, the present invention contemplates the provision of special cross heads 3 which are provided at their ends with pairs of channels 4, 5 arranged in crossed, intersecting, relationship.

Novel angle-shape attaching pieces or arms 6 have one end received in one or the other of the channels 4, 5 at the respective ends of the cross heads 3, and detachably secured to the cross head in any manner as, for instance, by a through-bolt 3' running through both of the members or arms and provided with a securing nut.

It will be observed that by providing angle-shape members or arms for the purpose, it is immaterial whether the slots 7 of the cross head 2 which are used to secure the shanks of the ordinary cultivator shovels are vertical or horizontal as it is a simple matter to position the arms 6 so that they will be received in the slots 7 or any similar holding means as may be provided on the cross heads 2 of the cultivator.

In the drawings, I have illustrated one of the arms 6 arranged with its rear part vertical and the other arm with its front part vertical. It will be observed that by providing the crossed seats or channels 4, 5 on the cross heads 3 of the attachments, the arms 6 can be arranged in either of the two positions shown at each end of the cross head 3.

This feature of the device renders it "universal" in its adaptability for connection to the shovel-carrying cross head of any of the well-known makes of cultivators, regardless of whether the channels or seats for the shanks 6 are horizontally or vertically arranged.

The ordinary shovels are detached and then the present attachment may be applied.

Wedges or keys 8 which are provided on the cross head 2, constitute a convenient means for securing the arms 6.

The disks for the respective units appear at 9, being carried by a shaft suitably mounted in bearings carried by a yoke 10, the yoke being surmounted by a double-toothed or ratchet plate 11 which may be riveted thereto.

Surmounting the plate 11 and pivoted on a bolt 12 is a head 13 having a drop-pawl 14 which is adapted to engage any of the teeth of the plate 11 to lock the frame 10 and the disks 8 in any position to which they may be swung on the vertical axis provided by the pivot bolt 12.

The head 13 and the cross-head 3 are adjustably locked together by a "rose" or ratchet clutch 15 whose sections are carried by said parts.

Carried by the cross head 3 is a pivot 16 which passes through a hole in the clutch 15 and carries a cam locking lever 17, pivoted thereto at 18. On depressing the lever 17, the sections of the clutch are engaged and on raising said lever, they are disengaged. The coupling or clutch thus provided enables the gangs of disks 9 to be tilted with their axes of rotation at any desired inclination and to be held in their adjusted positions.

It will be observed that the yoke 10 can be swung to any desired position and even completely reversed without removing a single bolt or fastening and thus the dirt can be thrown to and from the row, as may be desired.

The cross heads 2 may have an additional hole or holder 7' to accommodate an extra shovel shank to each cross head when shovels, instead of disks, are used.

What I claim is:

1. A disk cultivator attachment for cultivators, comprising disks, a cross head to which they are connected, and similar, independent, reversible attaching arms or members reversibly connected to said cross head, by which the attachment may be connected to a cultivator.

2. A disk cultivator attachment for cultivators, comprising disks, a cross head to which they are connected, and similar, independent, reversible angle-shape arms or members reversibly connected to the cross head and constituting means by which the attachment may be connected to a cultivator.

3. A disk cultivator attachment for cultivators, comprising disks, a cross head to which they are connected, and duplicate, detachable and interchangable reversible angle-shape arms or members reversibly connected to the cross head, by which the attachment may be connected to a cultivator.

4. A disk cultivator attachment for cultivators, comprising disks, a cross head to which they are connected, said cross head having a plurality of seats, arms or members adapted to be engaged with different ones of said seats to dispose said arms or members in different relationships to the cross head, and means for securing the arms or members in the seats, said arms or members constituting adjustably mounted means for securing the attachment to a cultivator.

5. A disk cultivator attachment for cultivators, comprising disks, a cross head to which they are connected, said cross heads having intersecting seats, angle-shape members or arms adapted for interchange with each other and for reversing as also for positioning in any of said seats, and means for securing the said angle-shape members in said seats, said members constituting means whereby the attachment may be secured to a cultivator.

6. In a disk cultivator attachment for cultivators, the combination with the cultivator frame and a cross-head mounted thereon, of a disk-gang-carrying cross-head, a clutch head pivoted to said disk-gang-carrying cross-head for turning on a general horizontal axis, a cam lever for engaging and disengaging said clutch head with the disk-carrying cross head, a yoke pivotally suspended from said clutch head on a general vertical axis, disks carried by said yoke, teeth carried by the yoke, and a locking pawl carried by the clutch and engageable with the said teeth.

7. A unitary disk cultivator attachment for cultivators comprising the combination with the cultivator frame and a cross-head mounted thereon, of a disk-gang-carrying cross-head, reversible arms or members carried by said disk-gang-carrying cross-head for connecting said cross head to the cross head of a cultivator, a yoke, disks carried by said yoke, a clutch head pivotally carried by the disk-gang-carrying cross head and pivotally carrying the yoke whereby the disks are mounted for horizontal swinging and for tilting, and independent locking means for securing the head and disk-gang-carrying cross head together and the head and yoke together, respectively.

In testimony whereof I affix my signature.

ALVAN V. BURCH.